US010564898B2

(12) United States Patent
Rao et al.

(10) Patent No.: US 10,564,898 B2
(45) Date of Patent: Feb. 18, 2020

(54) SYSTEM AND METHOD FOR STORAGE DEVICE MANAGEMENT

(71) Applicant: Western Digital Technologies, Inc., San Jose, CA (US)

(72) Inventors: Abhijit Rao, Bangalore (IN); Vinod Sasidharan, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/101,169

(22) Filed: Aug. 10, 2018

(65) Prior Publication Data

US 2019/0377516 A1 Dec. 12, 2019

Related U.S. Application Data

(60) Provisional application No. 62/683,604, filed on Jun. 11, 2018.

(51) Int. Cl.
*G06F 3/06* (2006.01)
*G06F 12/02* (2006.01)
*G06F 9/54* (2006.01)

(52) U.S. Cl.
CPC ............ *G06F 3/0659* (2013.01); *G06F 3/061* (2013.01); *G06F 3/0604* (2013.01); *G06F 3/0679* (2013.01); *G06F 3/0683* (2013.01); *G06F 9/546* (2013.01); *G06F 12/0246* (2013.01); *G06F 2212/7201* (2013.01)

(58) Field of Classification Search
CPC ............ G06F 13/1642; G06F 13/1673; G06F 13/4068; G06F 13/4282; G06F 2213/0026; G06F 3/061
See application file for complete search history.

(56) References Cited

U.S. PATENT DOCUMENTS 8,321,627 B1 * 11/2012 Norrie .................. G06F 13/161
365/185.33
2018/0314663 A1 * 11/2018 Nishimoto .......... G06F 13/4068

* cited by examiner

*Primary Examiner* — Idriss N Alrobaye
*Assistant Examiner* — Richard B Franklin
(74) *Attorney, Agent, or Firm* — Patterson & Sheridan, LLP; Steven H. Versteeg (57) ABSTRACT

A method and apparatus for managing storage devices includes a host interface, a plurality of storage device interfaces, and a processor. The host interface is configured to communicatively couple with a host device and the plurality of storage interfaces configured to communicatively couple with storage devices. The processor is communicatively coupled to the host interface and the plurality of storage device interfaces. Further, the processor is configured to receive requests from the host device via the host interface and communicate the requests to the storage devices via the plurality of storage device interfaces. The processor is additionally configured to receive responses from the storage devices via the plurality of storage interfaces and communicate the responses to the host device via the host interface, manage a global submission queue and a global completion queue, and manage a submission queue and a completion queue for each of the storage devices.

28 Claims, 6 Drawing Sheets

SYSTEM AND METHOD FOR STORAGE DEVICE MANAGEMENT

CROSS-REFERENCE TO RELATED APPLICATIONS

This application claims priority to U.S. Provisional Patent Application Ser. No. 62/683,604, filed on Jun. 11, 2018, which herein is incorporated by reference.

BACKGROUND OF THE DISCLOSURE

Field of the Disclosure

Embodiments of the present disclosure generally relate to a storage device manager for managing communication between storage devices and a host device.

Description of the Related Art

The non-volatile memory express (NVMe) interface allows a host device to communicate with a non-volatile memory subsystem. The NVMe interface supports parallel operation by providing 65535 input/output (I/O) queues with up to 64K commands per I/O command. Various storage devices have been implemented to communicate via the NVMe interface; however, some implementations of the storage devices are able to utilize only a fraction of the maximum I/O queues supported by the NVMe interface. Typically, these are lower cost storage devices. For example, various low cost NVMe storage devices may only support 32 or 64 I/O queues. As compared to NVMe storage devices that support 128 or 256 I/O queues, the low cost NVMe storage devices under-utilize the NVMe interface, and have a smaller input/output operations per second (IOPS) metric than that of NVMe storage devices with larger I/O queues. However, to improve the IOPS metric of an NVMe storage device, the processing power and memory buffer of the storage device needs to increased, increasing the cost of the storage device.

Thus, what is needed is a device that increases the processing capabilities and buffer size of a storage device, without prohibitively increasing the cost of the storage device.

SUMMARY OF THE DISCLOSURE

The present disclosure generally describes a method and apparatus for managing storage devices includes a host interface, a plurality of storage device interfaces, and a processor. The host interface is configured to communicatively couple with a host device and the plurality of storage interfaces configured to communicatively couple with storage devices. The processor is communicatively coupled to the host interface and the plurality of storage device interfaces. Further, the processor is configured to receive requests from the host device via the host interface and communicate the requests to the storage devices via the plurality of storage device interfaces. The processor is additionally configured to receive responses from the storage devices via the plurality of storage interfaces and communicate the responses to the host device via the host interface, manage a global submission queue and a global completion queue, and manage a submission queue and a completion queue for each of the storage devices.

A method and apparatus for managing storage devices includes a host interface, a plurality of storage device interfaces, and a processor. The plurality of host interface is configured to communicatively couple with a host device and the plurality of storage interfaces configured to communicatively couple with storage devices. The processor is communicatively coupled to the host interface and the plurality of storage device interfaces. Further, the processor is configured to receive requests from the host device via the host interface and communicate the requests to the storage devices via the plurality of storage device interfaces. The processor is additionally configured to receive responses from the storage devices via the plurality of storage interfaces and communicate the responses to the host device via the host interface, manage a global submission queue and a global completion queue, and manage a submission queue and a completion queue for each of the storage devices.

In one embodiment, a method for managing storage devices comprises receiving a request from a host device, updating a global submission queue in response to receiving the request, identifying a first storage device from a plurality of storage devices, and transmitting the request to the first storage device. The method further comprises updating a submission queue corresponding to the first storage device in response to transmitting the request to the first storage device, and updating a global completion queue and a completion queue corresponding to the first storage device in response to completion of the request by the first storage device.

In another embodiment, a storage device comprises a housing and a storage management device disposed within the housing. The housing having a plurality of ports configured to receive storage devices. Further, the storage management comprises a memory and a processor communicatively coupled to the memory. The memory comprises a global submission queue and a global completion queue. The processor is configured to receive requests from the host device and communicate the requests to the storage devices via the plurality of ports, receive responses from the storage devices via the plurality of ports and communicate the responses to the host device, update the global submission queue and a submission queue corresponding to a first storage device of the storage devices in response to receiving the requests, and update the global completion queue and a completion queue corresponding to the first storage device in response to completion of the requests.

In another embodiment, an external storage device comprises a host interface, a plurality of storage device interfaces and a memory. The host interface is configured to communicatively couple with a host device having a first read/write speed. The plurality of storage device interfaces is configured to communicatively couple with storage devices having a second read/write speed less than the first read/write speed. The memory comprises a host input/output queue, and the host input/output queue is larger than an input/output queue of each of the storage devices.

In another embodiment, a data storage device comprises a means for receiving requests from a host device, means for storing the requests within a memory, and means for identifying a first storage device and a second storage device based on a first one of the requests and a second one of the requests. The data storage device further comprises means for communicating the first one of the requests to the first storage device and the second one of the requests to the second storage device, means for receiving a response from the first storage device and a response from the second storage device; and means for updating a global submission queue corresponding to the host device based on the first and second requests, updating a submission queue corresponding to the first storage device based on the first second request, and updating a submission queue corresponding to the second storage device based on the second request. Moreover the data storage device comprises means for updating a global completion queue corresponding to the host device based on the first and second responses, a completion queue corresponding to the first storage device based on the first response, and a completion queue corresponding to the second storage device based on the second response.

In another embodiment, a client device for storage device management comprises a load balancing module, a queue management module, a global mapping table, and a command acknowledgement module. The load balancing module is configured to distribute input/output commands of a host device to a plurality of removable storage devices. The queue management module configured to update the global submission queue and global completion queue, and update submission queues and completion queues of the plurality of removable storage devices. The global mapping table comprising an indexing of data stored within each of the plurality of removable storage devices, and an identifier for each of plurality of removable storage devices. The command acknowledgement module configured to communicate an acknowledgement from each of the plurality of removable storage devices to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures.

It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A method and apparatus for managing storage devices includes a host interface, a plurality of storage device interfaces, and a processor. The host interface is configured to communicatively couple with a host device and the plurality of storage interfaces configured to communicatively couple with storage devices. The processor is communicatively coupled to the host interface and the plurality of storage device interfaces. Further, the processor is configured to receive requests from the host device via the host interface and communicate the requests to the storage devices via the plurality of storage device interfaces. The processor is additionally configured to receive responses from the storage devices via the plurality of storage interfaces and communicate the responses to the host device via the host interface, manage a global submission queue and a global completion queue, and manage a submission queue and a completion queue for each of the storage devices.

Figure 1:
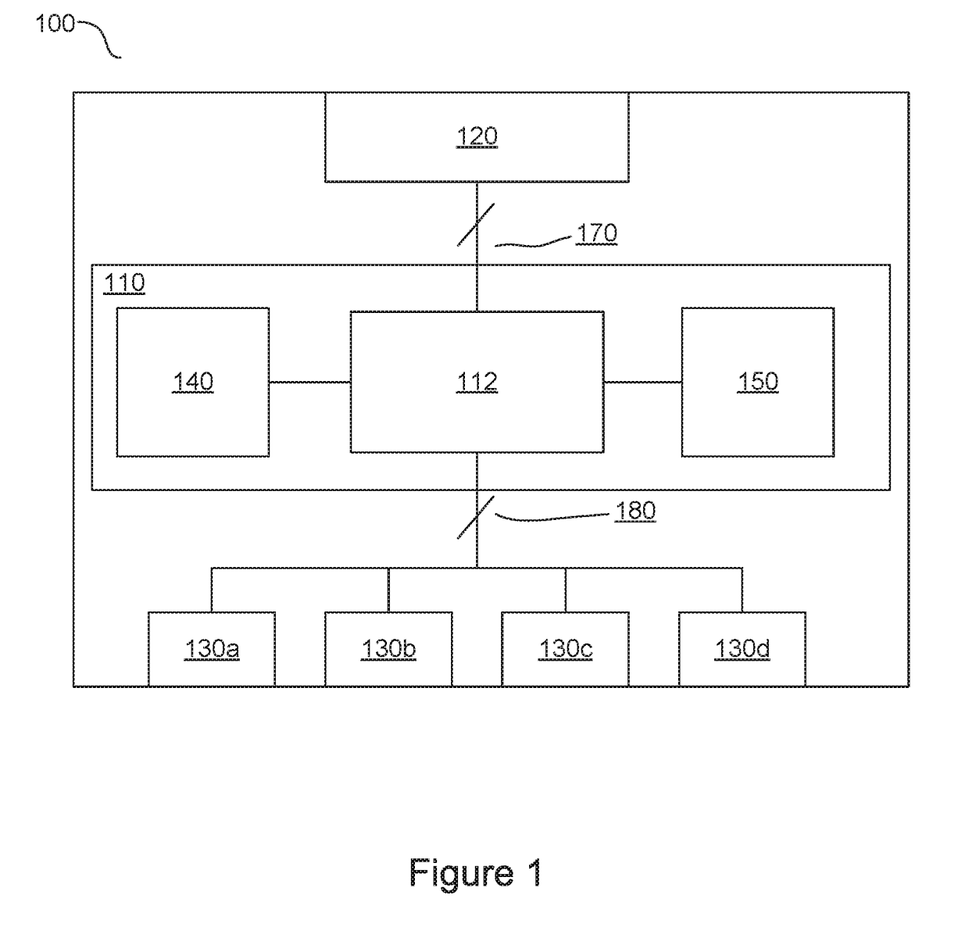
FIGS. 1 and 2 illustrate a storage management device according to one or more embodiments.

FIG. 1 illustrates a storage device management system 100 comprising a storage manager 110, host interface 120, and storage device interfaces 130. Storage manager 110 includes processor 112 and memories 140 and 150. As is illustrated, processor 112 is communicatively coupled with host interface 120 and storage device interfaces 130. In one embodiment, processor 112 is communicatively coupled to storage device interfaces 130 via communication bus 180 and to host interface 120 via communication bus 170. In one embodiment, storage manager 110 is a system on chip (SOC). Further, the storage device management system 100 may be referred to as an external storage device and/or a data storage device. In one embodiment, storage device management system 100 may function as a client device.

Processor 112 may be any general-purpose central processing unit (CPU). For example, processor 112 may be an x86-based, ARM®-based processor or the like. The processor my include one or more cores and associated circuitry (e.g., cache memories, memory management units, interrupt controllers, etc.). Processor 112 may be configured to execute program code that performs one or more operations described herein which may be stored as firmware within memory 150.

Host interface 120 is configured to couple an host device (e.g., host device 260 of FIG. 2) with storage manager 110. The host device may be any external computing system. In one embodiment, host interface 120 is a non-volatile memory express (NVMe) communication protocol. In other embodiments, host interface 120 supports an NVMe communication protocol and one or more other communication protocols. For example, the host interface 120 may be configured to communicate via a NVMe communication protocol with processor 112 and a second protocol with an host device. The second protocol may be one of a peripheral component interconnect (PCI), peripheral component interconnect express (PCIe), Thunderbolt™, Universal Serial Bus (USB), BlueTooth®, and wireless local area network (wlan). In other embodiments, other communication protocols may be used. In embodiments utilizing at least two communication protocols, host interface 120 is configured to receive data from the host device using a first protocol (e.g., Thunderbolt™), convert the data to a second protocol (e.g., NVMe) and communicate the data to the processor 112. Further, the host interface 120 may be configured to receive data from processor 112 via the second protocol, convert the data to the first protocol and communicate the data to the host device.

In one embodiment, the host device comprises read/write speed that is faster than the read/write speed of each of the storage devices.

In one or more embodiments, the host interface 120 may include physical port configured to receive a connector of a host device. In other embodiments, the host interface 120 includes a wireless connection.

Figure 2:
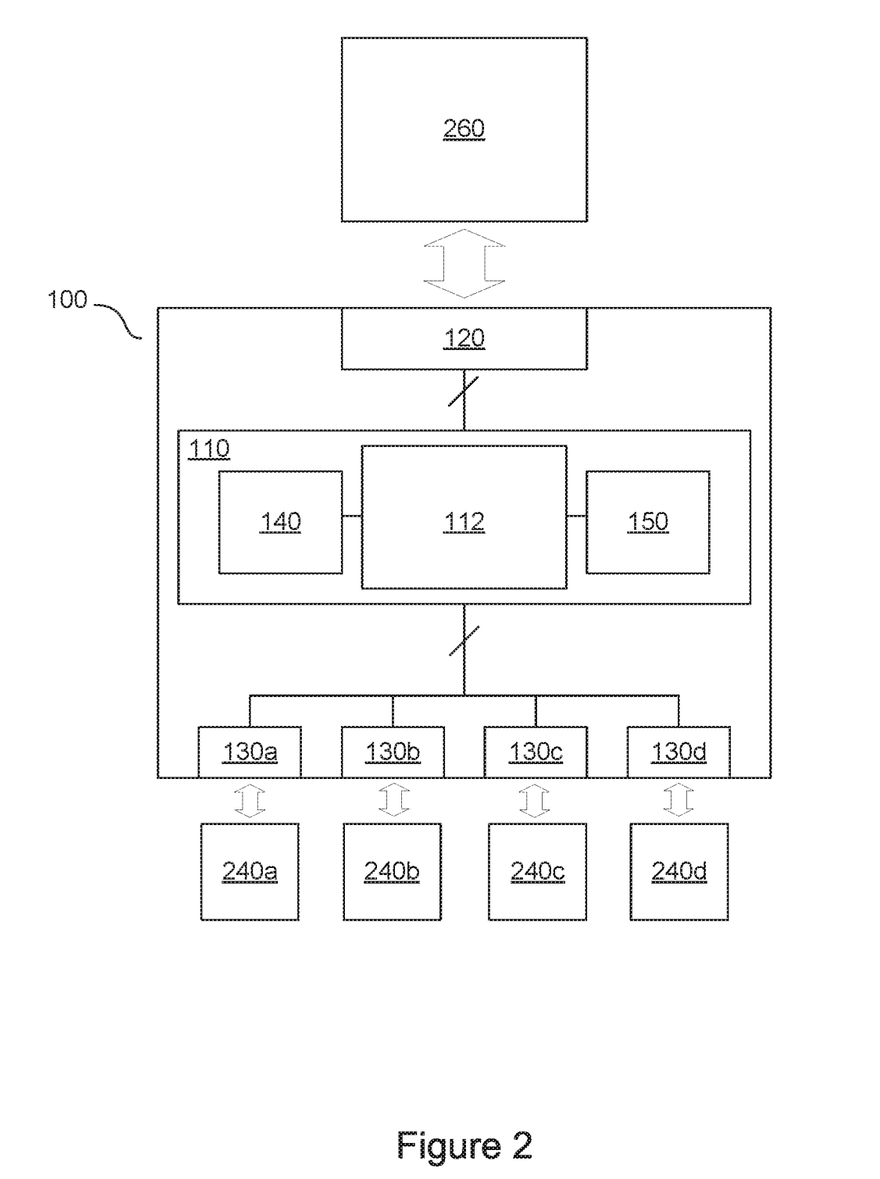

Storage device interfaces 130 may include a port that is configured to receive a storage device (e.g., storage device 140*a* of FIG. 2). Storage device interfaces 130 may support the ability to insert and remove a corresponding storage device. For example, storage device 140*a* may be inserted into storage device interface 130*a* and removed from storage device interface 130*a*. Moreover, storage device interfaces 130 and storage manager 110 may support hot-swappable capabilities (described in greater detail in the following).

In the embodiment of FIG. 1, four storage device interfaces (e.g., storage device interfaces 130*a*-130*d*) are illustrated; however, in other embodiments, more or less than four storage device interfaces may be utilized. In one embodiment, the storage device management system 100 includes at least two storage device interfaces. Further, the storage device interface 130 may include an odd or even number of storage device interfaces.

Processor 112 is coupled to storage device interfaces 130 via communication bus 180. In one embodiment, processor 112 is coupled in parallel with each of storage device interfaces 130 via communication bus 180, such that processor 112 is able to access each of the storage devices coupled to the storage device interfaces independently. Processor 112 is further communicatively coupled with host interface via communication bus 170. Communication bus 170 and communication bus 180 may be formed of one or more communication paths.

Memory 140 and/or memory 150 may be optional, and processor 112 is communicatively coupled with each of the memories. In one embodiment memory 150 is a non-volatile memory (NVM) and memory 140 is comprised of random access memory (RAM). In one embodiment, memory 140 includes at least eight gigabytes of RAM. In other embodiments, other sizes of RAM may be utilized. Memory 140 may be configured to store data received from a host device (e.g., host device 260) and a storage device (storage device 240). Further, memory 150 may be configured to store firmware that is executed by processor 112. For example, memory 150 may provide instructions to be executed by processor 112.

FIG. 2 illustrates storage device management system 100 according to one or more embodiments. As illustrated in FIG. 2, the storage device management system 100 is coupled to host device 260 and storage devices 240, and storage device management system 100 controls communication between host device 260 and storage devices 240. For example, the host device 260 does not communicate directly with each storage device 240, however, communication is controlled by processor 112. Thus, while the storage device management system 100 is configured to control multiple storage devices, to host device 260, the storage device management system 100 appears as and functions a single end point, not as individual memory cards. For example, processor 112 is configured to receive requests (i.e., commands) from host device 260 via the host interface 120 and communicate the requests to the storage devices 240 via the plurality of storage device interfaces 130. Further, processor 112 is configured to receive responses (input commands) from the storage devices 240 and communicate the responses (output commands) to the host device 260.

The host device may be any computing device. For example, the host device may be any one of a personal computing device, mobile phone, tablet computing device, and/or electronic computing device. In one particular embodiment, the host device 260 is a laptop comprising a Thunderbolt™ port, and storage device management system 100 is configured to couple to the laptop via a wired connection and communicate with the laptop with over the wired connection using the Thunderbolt™ communication protocol.

Storage devices 240 may be a memory card, such as a secure digital (SD), compact flash (CF), compact flash express (CFX), and the like. Further, storage device interfaces 130 may be configured to receive and communicate with the memory card using a similar protocol. Further, the storage device interfaces 130 have a size and/or shape as storage devices 240 and they are configured to receive the storage device. Further, the storage device interfaces 130 may support a NVMe communication protocol. In various embodiments, the storage devices are removeably coupled to a corresponding one of storage device interfaces 130.

In various embodiments, storage device management system 100 (and storage manager 110) behaves like a virtual host for storage devices 240 by forwarding requests and acknowledging responses. The storage device management system 100 receives data from each storage device 240 and forwards them to the host device 260. Further, storage device management system 100 (including storage devices 240) functions like a large storage device to host device 240. For example, storage device management system 100 acknowledges responses, receives I/O admin requests and generates interrupts for responses. In various embodiments, the storage device management system 100 performs dual roles, for example, as a host device for storage devices 240, and as a storage device for host device 260. Further, the storage device management system 100 preforms command and data management.

Figure 3:
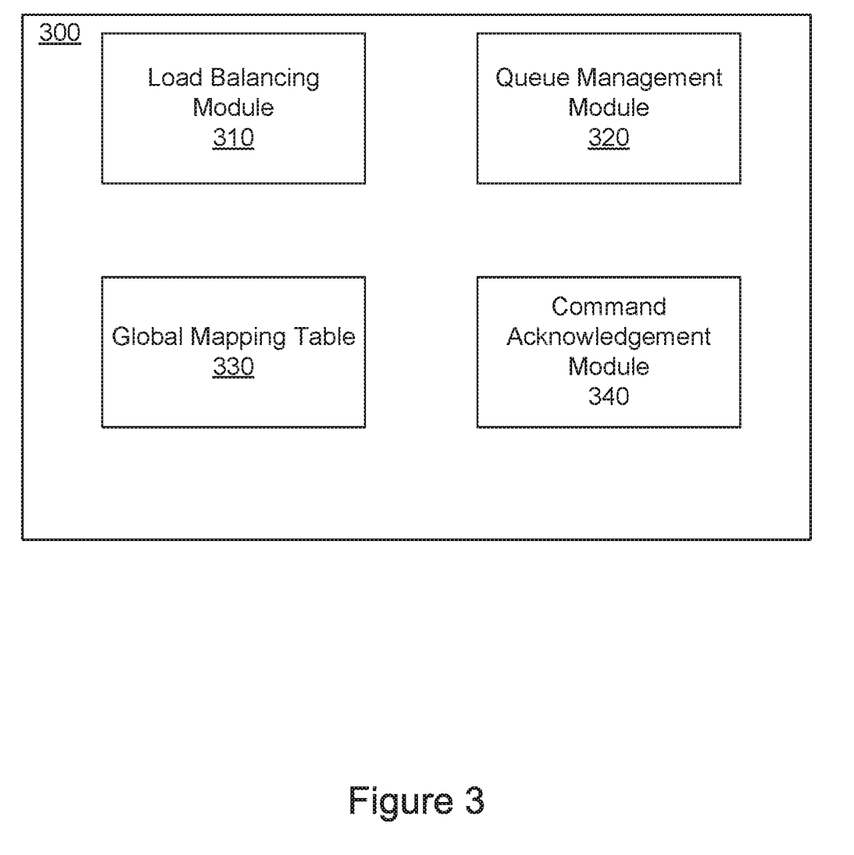
FIG. 3 illustrates an embodiment of a storage manager according to one or more embodiments.

Various modules and management features 300 utilized by storage manager 110 are illustrated in FIG. 3. Specifically, the embodiment of FIG. 3 illustrates load balancing module 310, queue management module 320, global mapping table 330 and command acknowledgement module 340. The load balancing module 310, queue management module 320 and command acknowledgement module 340 may be part of a firmware layer stored within memory 150. In such an embodiment, each of the modules may include instructions that are accessed and executed by processor 112. In one embodiment, load balancing module 310, queue management module 320, global mapping table 330 and command acknowledgement module 340 are part of a client device for storage device management.

In one embodiment, processor 112 maybe configured to generate global mapping table 330. The global mapping table 330 may be any database or look-up-table (LUT) stored within memory 150 and managed by processor 112.

In one embodiment, the global mapping table 330 maps an identifier of each storage with the sectors assigned to each storage device. For example, a first storage device may be assigned to sectors 0 to 10,000 and a second storage device may be assigned to sectors 10,001 to 20,000, which are reflected within the mapping table. The processor 112 may be further configured to generate an identifier for each storage device 240. The identifier may be used to identify a storage device when a request is received from host device 260 and may be stored within a mapping table located in memory 150.

In one or more embodiments, processor 112 receives a request from the host device 260, identifies a storage device form the global mapping table 330 based on the sectors included within the request, and communicates the request to the identified storage device.

In one embodiment, when a storage device is inserted within storage device management system 100, processor 112 assigns sectors and an identifier to the storage device, and updates the global mapping table 330. In one embodiment, when a new storage device is detected, sectors assigned to one or more other storage devices may be reassigned to the new storage device, and the global mapping table 330 is updated to reflect any changes. Further, to support hot-swappable capabilities, when a storage device is selected for removal from the storage device management system 100, processor 112 reassigns the sectors assigned to the selected storage device to another storage device or devices and updates the mapping table accordingly. In one embodiment, processor 112 may also copy and/or move data stored from a storage device selected for removal to another storage device.

Load balancing module 310 comprises one or more features that distribute input/output commands across the storage devices coupled to the storage device management system 100. In one embodiment, load balancing module 31 3200 is configured to balance the input/output commands such that each of the storage devices is similarly utilized. For example, load balancing module 310 may be configured to receive requests provided by host device 260, and order the requests such that storage devices 240 are utilized in a parallel fashion. Further, the load balancing module 310 is configured to ensure that one storage device is not utilized to a greater extent than the others.

In one embodiment, requests received from host device 260 may be stored within a queue in memory 140 which are then forwarded to each storage device. The load balancing module 310 may be configured to identify which of the storage devices are currently being accessed and/or have larger queue and reorder the requests such that requests may be transmitted to less busy and/or storage devices with small queues.

Queue management module 320 may be configured to manage a global submission queue and a global completion queue and a submission and completion queue for each coupled storage device 240. The global submission queue and the global completion queue may be stored within memory 150 and accessed by processor 112. In one embodiment, queue management module is configured change the global submission queue in response to receipt of a request from the host device and change the global completion queue in response to communicating a response to the host device. Further, the queue management module 320 is configured to change a submission queue corresponding to each of the storage devices based on responses communicated to the storage devices and change a completion queue for each of the storage devices in response to responses provided by the storage devices. In one embodiment, queue management module 320 is configured to change a submission queue of storage device 240*a* when a request is transmitted to the storage device and change a completion queue of storage device 240*a* when a response is transmitted from the storage device. In one embodiment, a request is stored within the global submission queue and forwarded to the corresponding storage device. The global completion and submission queue may be referred to as a host input/output queue.

The global submission queue is larger than the submission queue of each of the storage devices communicatively coupled to the storage management system. In one embodiment, the global submission queue supports at least 128 queues. In another embodiment, the global submission queue supports at least 256 queues. Further, the submission queue of each of the storage devices may not support more than 64 queues. In one embodiment, the submission queue of each of the storage devices does not supports any more than 32 queues.

As with the global submission queue, the global completion queue is also larger than the completion queue of each of the storage devices communicatively coupled to the storage management system. In one embodiment, the global completion queue supports at least 128 queues. In another embodiment, the global completion queue supports at least 256 queues. Further, the completion queue of each of the storage devices may not support more than 64 queues. In one embodiment, the completion queue of each of the storage devices does not support more than 32 queues.

The global submission and completion queues may be stored within memory 140. Further, in one or more embodiments, submission and completion queues for each of the memory devices may be stored within memory 140. In such embodiments, a mapping of the queues may be maintained within memory 140. In another embodiment, the submission and completion queues for each of the storage devices may be located within each corresponding storage device. In one embodiment, when communicating with a host device, storage manager 110 utilizes the global submission and completion queue. Further, when communicating with a storage device, storage manager 110 utilizes submission and completion queues that correspond to the storage device. The host device manages a submission and completion queue separate from the global submission and completion queues of storage manager 110. Additionally, storage manager 110 maintains a submission and completion queue for each storage device, and each storage device also manages a corresponding a submission and completion queue located within the storage device.

In one embodiment, storage manager 110 maintains a global submission and completion queue, which is used to communicate with a submission and completion queue on the host device. Further, storage manager 110 maintains a submission queue and completion queue for each of the storage devices which is used to communicate with the global submission and global completion queues of the storage manager. In one embodiment, the response from each storage device 240 is arranged corresponding to the storage device into separate response queues, which are then forwarded to the host device.

Command acknowledgement module 340 may be configured to perform command acknowledgement to the host device 260 for each of storage devices 240. An acknowledgement may be sent to the host device 260 in response to transmitting a request to a storage device.

Figure 4:
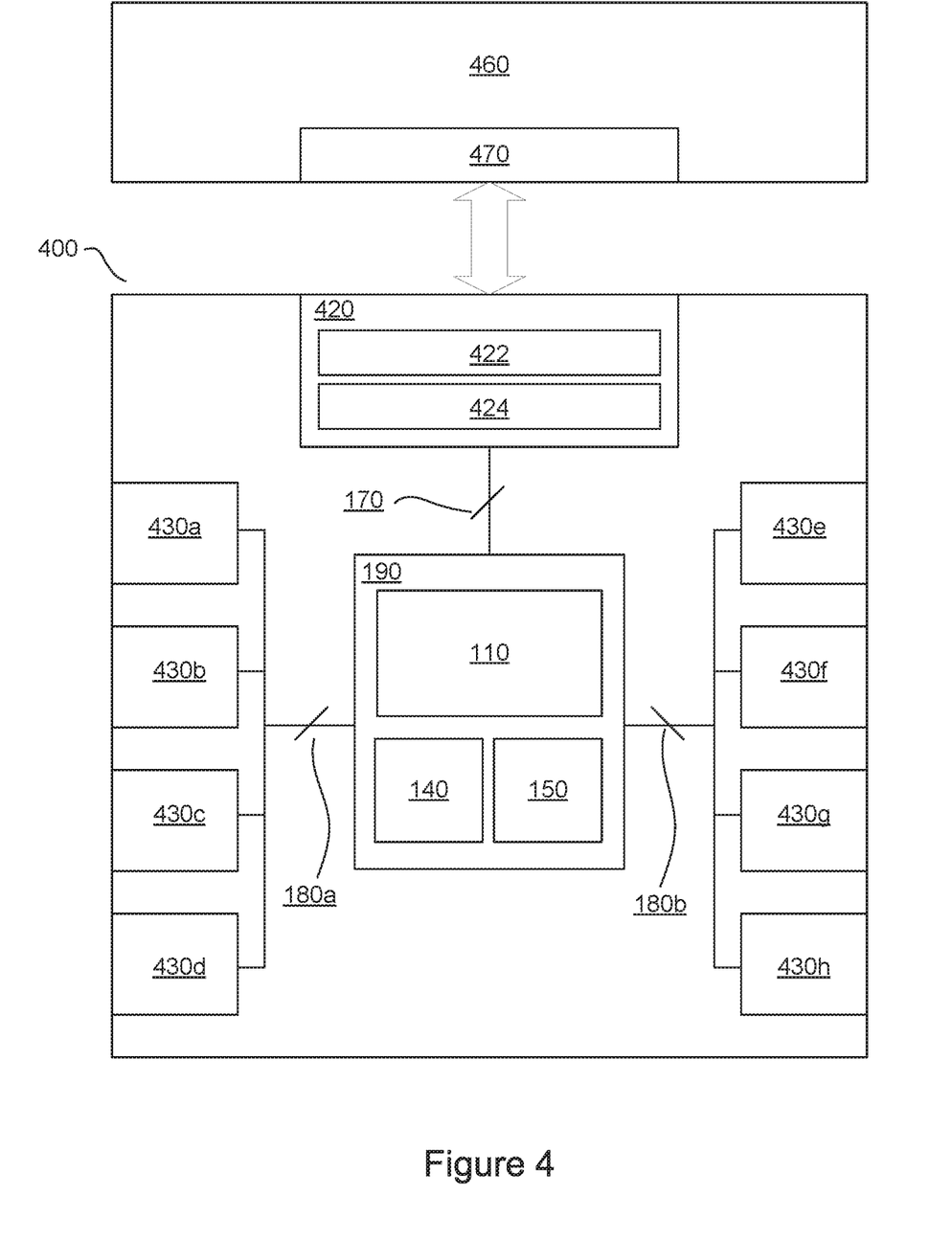
FIG. 4 illustrates a storage management device according to one or more embodiments.

FIG. 4 illustrates storage device management system 400 and host device 460, according to one or more embodiments. As illustrated, storage device management system 400 includes host interface 420 that is configured to communicatively couple with the interface 470 of host device 460. Storage device management system 400 further includes storage manager 110, and storage device interfaces 430.

Storage manager 110 includes processor 112 and memories 140 and 150. Further, storage manager 110 is communicatively coupled to host interface 420 via communication bus 170, and to storage device interfaces 430 via communication buses 180a and 180b. In one embodiment, communication bus 180a and communication bus 180b may be part of a single communication bus (e.g., communication bus 180).

In one embodiment, host interface 420 is configured to communicate with interface 470 using the first communication protocol and communicate with storage manager 110 via a second interface different than the first interface. As the two communication protocols are different, host interface 420 is configured to bridge the communication protocols, converting requests received using the first protocol from host device 460 to the second protocol which may be used to communicate with storage manager 110. Further, host interface 420 is configured to convert responses received using the second protocol to the first protocol which may be used to communicate with host device 460 via interface 470.

The embodiment of FIG. 4, host interface 420 includes communication protocols 422 and 424, where communication protocol 422 is the same protocol as that of interface 470. Further, host interface 420 is configured to receive data using protocol 422, convert the data to protocol 424 and communicate that data to storage devices via storage device interfaces 430 and communication bus 180. In one embodiment, the first communication protocol 422 is a Thunderbolt™ communication protocol and the second communication protocol 424 a NVMe communication protocol. Further, host interface 420 may include a communication bridge that converts input/output data between the first and second communication protocols 422, 424.

FIG. 4 further illustrates storage management system 100 having eight storage device interfaces 430a-430h. In other embodiments, more than eight storage device interfaces may be utilized or less than eight storage device interfaces may be utilized. Storage device interfaces 430 are configured to communicatively couple with a storage device, such as a memory card. In one embodiment, each storage device interface 430 comprises a port and is configured to receive a storage device. Further, each storage device interface 430 may be configured to communicatively couple with a common type of storage device. In one or more embodiments, at least one of the storage device interfaces 430 may be configured to communicatively couple with a type of storage device different from at least one other storage device interface. Further, one or more of the storage device interfaces 430 may be configured to communicatively couple with more than one type of storage device.

Figure 5:
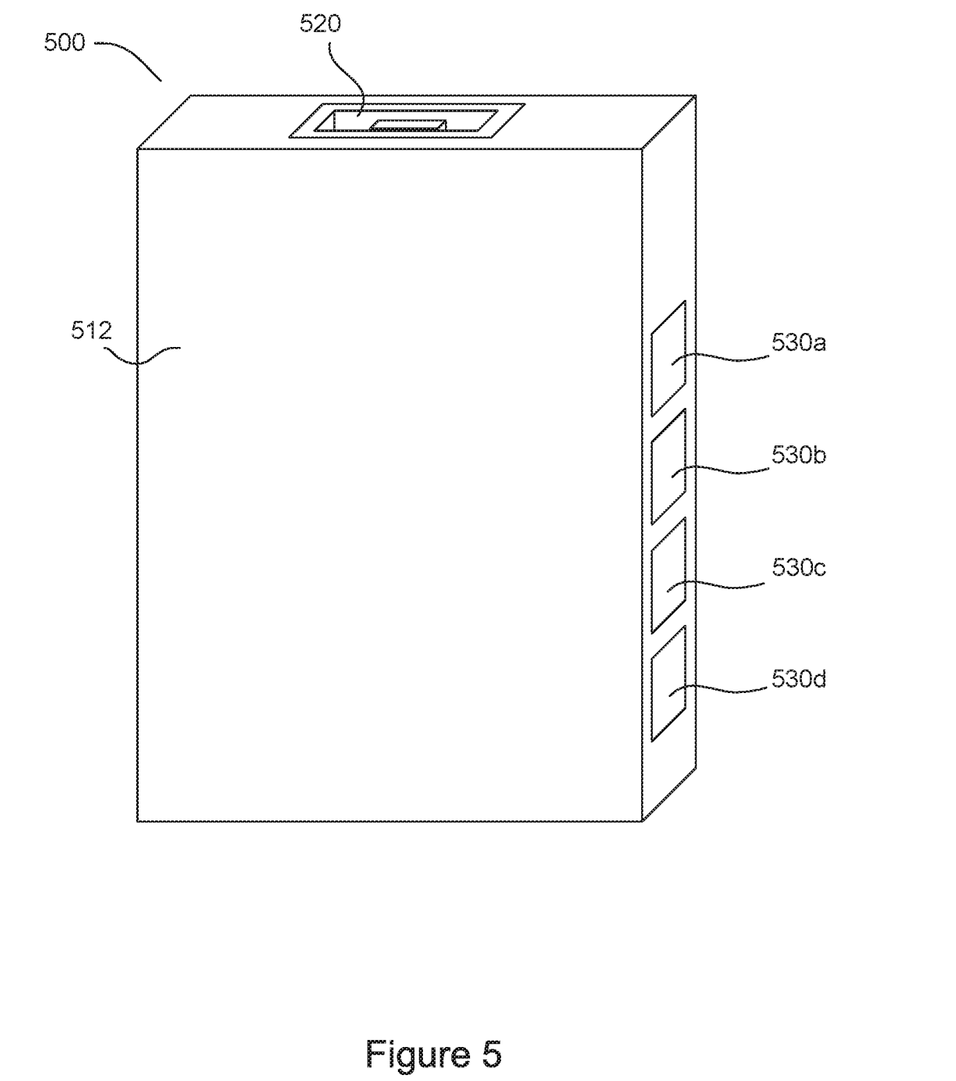
FIG. 5 illustrates a storage device according to one or more embodiments.

FIG. 5 illustrates a storage device 500 according to one or more embodiments. The storage device 500 comprises housing 512, host interface 520, and storage device interfaces 530. In one embodiment, housing 512 is formed from a plastic material and has a rectangular shape. In other embodiments, housing 512 may be formed from other materials and have any shape. While not illustrated, storage device management system 100 further includes a storage management device disposed within housing 512 and configured to control communication between host interface 520 and storage device interfaces 530. The storage management device may be similar to design and function as storage manager 110. Host interface 520 may be port configured to couple to a first end of a cord and a second end of the cord may be coupled to a host device (e.g., host device 260), communicatively coupling the host device with the storage device management system 100.

Each of storage device interfaces 530 (530a-530b) includes a slot configured to receive a storage device. Further, while not illustrated, each of the storage device interfaces includes connectors configured to connect to the connectors of a storage device. In one embodiment, the size and shape of the storage device interfaces 530 may correspond to the size and shape of the storage device that the interface is configured to receive.

Figure 6:
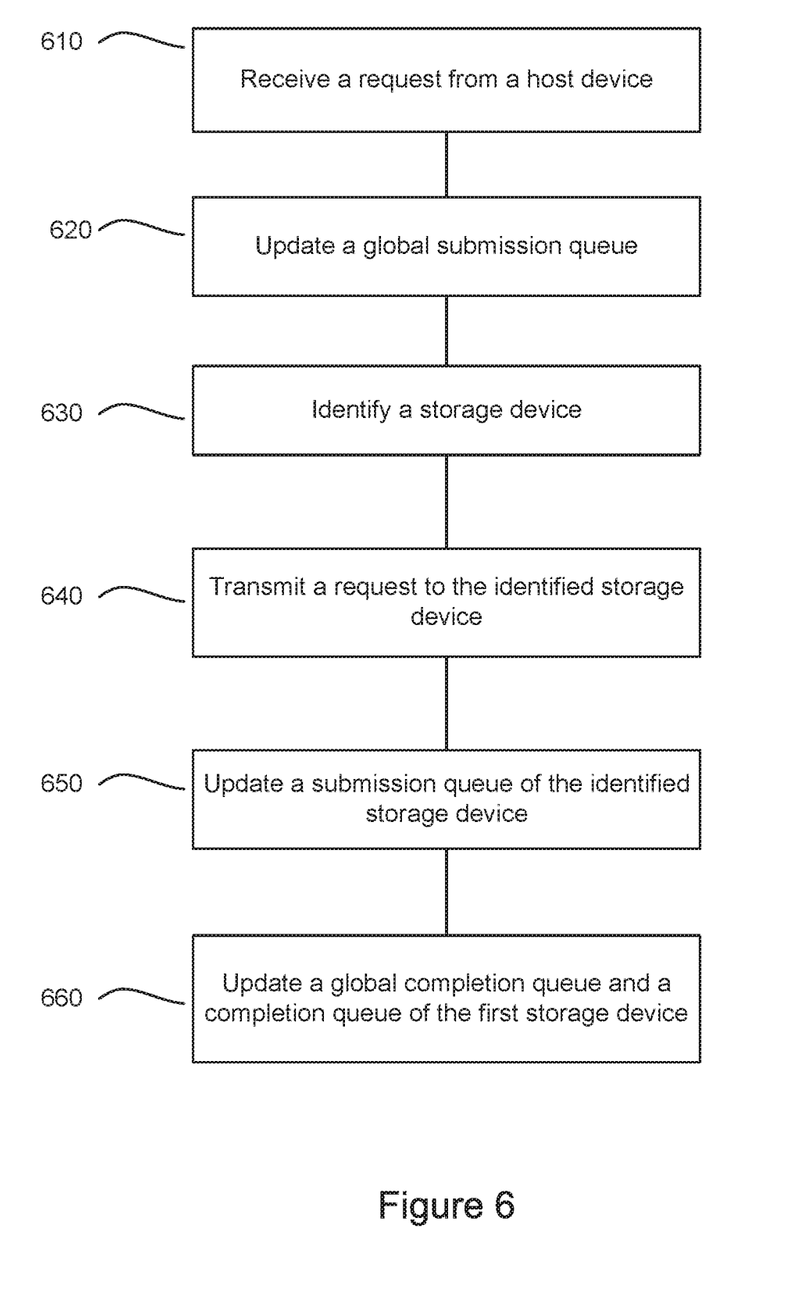
FIG. 6 illustrates a method for managing storage devices according to one or more embodiments.

FIG. 6 illustrates a method for managing storage devices according to one or more embodiments. At 610 of the method, a request is received from a host device. For example, storage manager 110 may receive a first request from host device 260 via host interface 120. Storage manager 110 may also receive a second request from host device 260. The first request and the second request may be received in parallel or serially to each other.

In one embodiment, storage device management system 100 is configured to receive a request utilizing a first communication protocol and convert the communication protocol to a second communication protocol. The request may be received over one of a wired and wireless connection.

At 620, a global submission queue is updated. In one embodiment, the global submission queue stored with memory 140 is updated by processor 112 in response to receiving the first and/or the second request from the host device. At 630, a storage device is identified from the storage devices communicatively coupled to storage device management system 100. In one embodiment, processor 112 is configured to identify a first storage device based on the first request received from host device 260 and global mapping table 330. Further, the processor 112 may be configured to identify a second storage device based on the second request received from host device 260 and global mapping table 330. For example, the processor 112, may determine which sector address is included with a request, compare the sector address to global mapping table 330, and identify the storage device based on the comparison.

At 640, the request is transmitted to the identified storage device. In one embodiment, processor 112 transmits the first request to the first storage device using communication bus 180 and a corresponding one of storage device interfaces 130. Processor 112 may also transmit the second request to the second storage device using communication bus 180 and a corresponding one of storage device interfaces 130. Further, at 650 a submission queue of the identified storage device is updated. For example, processor 112 may be configured to update a submission queue corresponding to the first and/or storage device in response to at least one of communicating the response to the storage device and identifying the storage device. Further, each of the storage devices may also update a submission queue located within the storage device in response to receiving the request from the storage manager 110. In one embodiment, the submission queue corresponding to a storage device is updated after the storage device has been identified and before communicating the request to the storage device. In other embodiments, the submission queue is updated after transmitting the request to the storage device. In one embodiment, the global mapping table 330 may be updated before or after the submission queue is updated. Further, in one embodiment, the global mapping 330 is updated in response to transmitting the request to an identified storage device.

At 660 of the method, a global completion queue and a completion queue of the identified storage device is updated in response to completion of the request by the identified storage device. In one embodiment, processor 112 updates the global completion queue stored within memory 140. Further, processor 112 may update the completion queue corresponding to the first and/or second storage devices in response to completion of the request by the first and/or second storage devices. Further, each of the storage devices may also update a completion queue located within the storage device in response to providing the response to the storage manager 110.

Completion of the request may correspond to the storage device providing a response to processor 112 via a storage device interface 130 for the request. The response may then be transmitted by processor 112 to the host device 260 via host interface 120. In one embodiment, the completion queue of the identified storage device is updated when the response is communicated from the storage device to the storage manager 110, and the global completion queue is updated when the response is communicated from the storage manager 110 to the host device.

In various embodiments, storage device management system 100 is configured to communicatively couple multiple storage devices with a host device, such that the multiple devices appear as a single storage device to the host device. Further, storage device management system 100 is configured to maintain global submission and completion queues as well as submission and completion queues for each of the storage devices to balance commands provided to each of the different storage devices. Additionally, storage device management system 100 employs a larger memory buffer than that of the storage devices, and as such, the global submission and completion queues are larger than the submission and completion queues of each of the devices. Thus, the speed benefits of larger more expensive storage devices may be extended to lower cost storage device.

In one embodiment, a storage device management system includes storage devices includes a host interface, a plurality of storage device interfaces, and a processor. The plurality of host interface is configured to communicatively couple with a host device and the plurality of storage interfaces configured to communicatively couple with storage devices. The processor is communicatively coupled to the host interface and the plurality of storage device interfaces. Further, the processor is configured to receive requests from the host device via the host interface and communicate the requests to the storage devices via the plurality of storage device interfaces. The processor is additionally configured to receive responses from the storage devices via the plurality of storage interfaces and communicate the responses to the host device via the host interface, manage a global submission queue and a global completion queue, and manage a submission queue and a completion queue for each of the storage devices.

In one embodiment, the global submission queue is larger than each of the submission queues, and the global completion queue is larger than each of the completion queues. Further, the storage device management system further includes a memory communicatively coupled with the processor and configured to store the requests received from the host device. In another embodiment, the processor is further configured to generate a global mapping table including an index for each of the plurality of storage devices.

In one embodiment, the processor is further configured to communicate with a host device using the global submission queue and the global completion queue, and communicate with a first one of the storage devices using submission queue and complete queue that corresponds to the first one of the storage devices. In another embodiment, a storage protocol for the plurality of storage devices is a non-volatile memory express (NVMe) storage protocol.

In one embodiment, managing the global submission queue and the global completion queue comprises updating the global submission queue in response to receiving each of the requests, and updating the global completion queue in response to completion of each of the requests by the plurality of storage devices. Further, managing the submission queue and the completion queue of each of the storage devices, comprises updating the submission queues in response to receiving each of the requests, and updating the completion queues in response to completion of each of the requests by the plurality of storage devices.

In one embodiment, a method for managing storage devices comprises receiving a request from a host device, updating a global submission queue in response to receiving the request, identifying a first storage device from a plurality of storage devices, and transmitting the request to the first storage device. The method further comprises updating a submission queue corresponding to the first storage device in response to transmitting the request to the first storage device, and updating a global completion queue and a completion queue corresponding to the first storage device in response to completion of the request by the first storage device.

In one embodiment, the method further comprises assigning a different identifier for each of the plurality of storage devices, and generating a global mapping based on the host data stored with the plurality of storage devices and the identifiers. Further, in one or more embodiments, the first storage device is identified based on the global mapping. In one embodiment, the method further comprises receiving a second request from the host device, updating the global submission queue in response to receiving the second request, identifying a second storage device from the plurality of storage devices based on the global mapping and the second request, transmitting the second request to the second storage device, updating a submission queue corresponding to the second storage device in response to transmitting the request to the second storage device, and updating the global completion queue and a completion queue corresponding to the second storage device in response to completion of the second request by the second storage device.

In another embodiment, a storage device comprises a housing and a storage management device disposed within the housing. The housing having a plurality of ports configured to receive storage devices. Further, the storage management comprises a memory and a processor communicatively coupled to the memory. The memory comprises a global submission queue and a global completion queue. The processor is configured to receive requests from the host device and communicate the requests to the storage devices via the plurality of ports, receive responses from the storage devices via the plurality of ports and communicate the responses to the host device, update the global submission queue and a submission queue corresponding to a first storage device of the storage devices in response to receiving the requests, and update the global completion queue and a completion queue corresponding to the first storage device in response to completion of the requests.

In one embodiment, the global submission queue is larger than the submission queue corresponding to the first storage device and the global completion queue is larger than the completion queue corresponding to the first storage device.

In one embodiment, updating the submission queue corresponding to a first storage device in response to receiving the requests, and updating the completion queue corresponding to the first storage device in response to completion of the requests comprises updating the submission queue corresponding to a first storage device in response to receiving a first one of the requests, and updating the completion queue corresponding to the first storage device in response to completion of the first one of the requests. Further, the processor is further configured to update a submission queue corresponding to a second storage device of the storage devices in response to a second one of the requests, and update a completion queue corresponding to the second storage devices in response to completion of the second one of the requests.

In one or more embodiments, the housing further includes a host interface, wherein the storage management device is further configured to communicatively couple with the host device via the host interface. In one embodiment, the storage management device is configured to communicatively couple with the host device via a wireless connection. In another embodiment, the processor is further configured to communicate with a host device using the global submission queue and the global completion queue.

In one embodiment, the processor is further configured to assign a different identifier for each of the plurality of storage devices, generate a global mapping based on host data stored within the plurality of storage devices and the identifiers, and identify the first storage device based on a first one of the requests. In one embodiment, the plurality of ports is configured to allow the storage devices to be removed.

In another embodiment, an external storage device comprises a host interface, a plurality of storage device interfaces and a memory. The host interface is configured to communicatively couple with a host device having a first read/write speed. The plurality of storage device interfaces is configured to communicatively couple with storage devices having a second read/write speed less than the first read/write speed. The memory comprises a host input/output queue, and the host input/output queue is larger than an input/output queue of each of the storage devices.

In one embodiment, the host input/output queue comprises a global submission queue and a global completion queue. In another embodiment, the eternal storage device further comprises a processor configured to receive a first request from the host device via the host interface and communicate the first requests to a first storage device of the storage devices via the plurality of storage device interfaces, and receive a first response from the first memory storage device via the plurality of storage device interfaces and communicate the first responses to the host device via the host interface. The processor is further configured to update the global submission queue and a submission queue corresponding to the first storage device in response to receiving the first request, and update the global completion queue and a completion queue corresponding to the first storage device in response to completion of the first request.

In one embodiment, the processor is further configured to assign a different identifier for each of the plurality of storage devices, generate a global mapping based on the identifiers and host data stored within the storage devices, and identify the first storage device based on the first request and the global mapping. In another embodiment, the host input/output queues support at least 128 queues and the input/output queue of each of the storage devices supports no more than 32 queues.

In another embodiment, a data storage device comprises a means for receiving requests from a host device, means for storing the requests within a memory, and means for identifying a first storage device and a second storage device based on a first one of the requests and a second one of the requests. The data storage device further comprises means for communicating the first one of the requests to the first storage device and the second one of the requests to the second storage device, means for receiving a response from the first storage device and a response from the second storage device; and means for updating a global submission queue corresponding to the host device based on the first and second requests, updating a submission queue corresponding to the first storage device based on the first second request, and updating a submission queue corresponding to the second storage device based on the second request. Moreover the data storage device comprises means for updating a global completion queue corresponding to the host device based on the first and second responses, a completion queue corresponding to the first storage device based on the first response, and a completion queue corresponding to the second storage device based on the second response.

In one embodiment, the global submission queue is larger than the submission queue corresponding to the first storage device and the submission queue corresponding to the second storage device, and the global completion queue is larger than the completion queue corresponding to the first storage device and the completion queue corresponding to the second storage device. In another embodiment, the data storage device further comprises means for generating a global mapping of host data stored within first storage device and the second storage device, and wherein the first storage device and the second storage device are further identified based on the global mapping. In one embodiment, the data storage device further comprises means for communicating the response from the first storage device and the response from the second storage device to the host device.

In another embodiment, a client device for storage device management comprises a load balancing module, a queue management module, a global mapping table, and a command acknowledgement module. The load balancing module is configured to distribute input/output commands of a host device to a plurality of removable storage devices. The queue management module configured to update the global submission queue and global completion queue, and update submission queues and completion queues of the plurality of removable storage devices. The global mapping table comprising an indexing of data stored within each of the plurality of removable storage devices, and an identifier for each of plurality of removable storage devices. The command acknowledgement module configured to communicate an acknowledgement from each of the plurality of removable storage devices to the host device.

In one embodiment, the client device further comprises a data communication module configured to further comprising a data communication module configured to receive requests from the host device and responses from the plurality of removable storage devices, and transmit the requests to the plurality of removable storage devices and transmit the responses to the host device.

While the foregoing is directed to embodiments of the present disclosure, other and further embodiments of the disclosure may be devised without departing from the basic scope thereof, and the scope thereof is determined by the claims that follow.

What is claimed is:

1. A storage device management system, comprising:
a host interface configured to communicatively couple with a host device;
a plurality of storage device interfaces configured to communicatively couple with storage devices;
a processor communicatively coupled to the host interface and the plurality of storage device interfaces, wherein the processor is configured to:
receive requests from the host device via the host interface and communicate the requests to the storage devices via the plurality of storage device interfaces;
receive responses from the storage devices via the plurality of storage device interfaces and communicate the responses to the host device via the host interface;
manage a global submission queue and a global completion queue; and
manage a submission queue and a completion queue for each of the storage devices.

2. The storage device of claim 1, wherein the global submission queue is larger than each of the submission queues, and the global completion queue is larger than each of the completion queues.

3. The storage device of claim 1 further comprising a memory communicatively coupled with the processor and configured to store the requests received from the host device.

4. The storage device of claim 1, wherein the processor is further configured to generate a global mapping table including an index for each of the plurality of storage devices.

5. The storage device of claim 1, wherein the processor is further configured to:
communicate with a host device using the global submission queue and the global completion queue; and
communicate with a first one of the storage devices using submission queue and complete queue that corresponds to the first one of the storage devices.

6. The storage device of claim 1, wherein a storage protocol for the plurality of storage devices is a non-volatile memory express (NVMe) storage protocol.

7. The storage device of claim 1, wherein managing the global submission queue and the global completion queue comprises:
updating the global submission queue in response to receiving each of the requests; and
updating the global completion queue in response to completion of each of the requests by the plurality of storage devices; and wherein managing the submission queue and the completion queue of each of the storage devices, comprises:
updating the submission queues in response to receiving each of the requests; and
updating the completion queues in response to completion of each of the requests by the plurality of storage devices.

8. The storage device of claim 1, wherein the storage device interfaces support hot-swappable capabilities.

9. A method for managing storage devices, the method comprising:
receiving a request from a host device;
updating a global submission queue in response to receiving the request;
identifying a first storage device from a plurality of storage devices;
transmitting the request to the first storage device;
updating a submission queue corresponding to the first storage device in response to transmitting the request to the first storage device; and
updating a global completion queue and a completion queue corresponding to the first storage device in response to completion of the request by the first storage device.

10. The method of claim 9 further comprising:
assigning a different identifier for each of the plurality of storage devices; and
generating a global mapping based on the host data stored with the plurality of storage devices and the identifiers.

11. The method of claim 10, wherein the first storage device is identified based on the global mapping.

12. The method of claim 10 further comprising:
receiving a second request from the host device;
updating the global submission queue in response to receiving the second request;
identifying a second storage device from the plurality of storage devices based on the global mapping and the second request;
transmitting the second request to the second storage device;
updating a submission queue corresponding to the second storage device in response to transmitting the request to the second storage device; and
updating the global completion queue and a completion queue corresponding to the second storage device in response to completion of the second request by the second storage device.

13. A storage device, comprising:
a housing having a plurality of ports configured to receive storage devices; and
a storage management device disposed within the housing and comprising:
a memory comprising a global submission queue and a global completion queue; and
a processor communicatively coupled to the memory, and configured to:
receive requests from the host device and communicate the requests to the storage devices via the plurality of ports;
receive responses from the storage devices via the plurality of ports and communicate the responses to the host device;
update the global submission queue and a submission queue corresponding to a first storage device of the storage devices in response to receiving the requests;
update the global completion queue and a completion queue corresponding to the first storage device in response to completion of the requests.

14. The storage device of claim 13, wherein the global submission queue is larger than the submission queue corresponding to the first storage device and the global completion queue is larger than the completion queue corresponding to the first storage device.

15. The storage device of claim 13, wherein updating the submission queue corresponding to a first storage device in response to receiving the requests, and updating the completion queue corresponding to the first storage device in response to completion of the requests comprises:
updating the submission queue corresponding to a first storage device in response to receiving a first one of the requests, and updating the completion queue corresponding to the first storage device in response to completion of the first one of the requests, and the processor is further configured to:
update a submission queue corresponding to a second storage device of the storage devices in response to a second one of the requests; and
update a completion queue corresponding to the second storage devices in response to completion of the second one of the requests.

16. The storage device of claim 13, wherein the housing further includes a host interface, wherein the storage management device is further configured to communicatively couple with the host device via the host interface.

17. The storage device of claim 13, wherein the storage management device is configured to communicatively couple with the host device via a wireless connection.

18. The storage device of claim 13, wherein the processor is further configured to:
communicate with a host device using the global submission queue and the global completion queue.

19. The storage device of claim 13, wherein the processor is further configured to:
assign a different identifier for each of the plurality of storage devices;
generate a global mapping based on host data stored within the plurality of storage devices and the identifiers; and
identify the first storage device based on a first one of the requests.

20. The storage device of claim 13, wherein the plurality of ports are configured to allow the storage devices to be removed.

21. An external storage device, comprising:
a host interface configured to communicatively couple with a host device having a first read/write speed;
a plurality of storage device interfaces configured to communicatively couple with storage devices having a second read/write speed less than the first read/write speed; and
a memory comprising a host input/output queue, wherein the host input/output queue is larger than an input/output queue of each of the storage devices, wherein the host input/output queue comprises a global submission queue and a global completion queue, the storage device further comprising a processor configured to:
receive a first request from the host device via the host interface and communicate the first requests to a first storage device of the storage devices via the plurality of storage device interfaces;
receive a first response from the first memory storage device via the plurality of storage device interfaces and communicate the first responses to the host device via the host interface;
update the global submission queue and a submission queue corresponding to the first storage device in response to receiving the first request; and
update the global completion queue and a completion queue corresponding to the first storage device in response to completion of the first request.

22. The external storage device of claim 21, wherein the processor is further configured to:
assign a different identifier for each of the plurality of storage devices;
generate a global mapping based on the identifiers and host data stored within the storage devices; and
identify the first storage device based on the first request and the global mapping.

23. The external storage device of claim 21, wherein the host input/output queues supports at least 128 queues and the input/output queue of each of the storage devices supports no more than 32 queues.

24. A data storage device, comprising:
means for receiving requests from a host device;
means for storing the requests within a memory;
means for identifying a first storage device and a second storage device based on a first one of the requests and a second one of the requests;
means for communicating the first one of the requests to the first storage device and the second one of the requests to the second storage device;
means for receiving a response from the first storage device and a response from the second storage device;
means for updating a global submission queue corresponding to the host device based on the first and second requests, updating a submission queue corresponding to the first storage device based on the first second request, and updating a submission queue corresponding to the second storage device based on the second request; and
means for updating a global completion queue corresponding to the host device based on the first and second responses, a completion queue corresponding to the first storage device based on the first response, and a completion queue corresponding to the second storage device based on the second response.

25. The data storage device of claim 24, wherein the global submission queue is larger than the submission queue corresponding to the first storage device and the submission queue corresponding to the second storage device; and the global completion queue is larger than the completion queue corresponding to the first storage device and the completion queue corresponding to the second storage device.

26. The data storage device of claim 24 further comprising:
means for generating a global mapping of host data stored within first storage device and the second storage device, and wherein the first storage device and the second storage device are further identified based on the global mapping.

27. A client device for storage device management, the client device comprising:
a load balancing module configured to distribute input/output commands of a host device to a plurality of removable storage devices;
a queue management module configured to:
update the global submission queue and global completion queue; and
update submission queues and completion queues of the plurality of removable storage devices;
a global mapping table comprising an indexing of data stored within each of the plurality of removable storage devices, and an identifier for each of plurality of removable storage devices; and
a command acknowledgement module configured to communicate an acknowledgement from each of the plurality of removable storage devices to the host device.

28. The client device of claim 27 further comprising a data communication module configured to:
receive requests from the host device and responses from the plurality of removable storage devices; and
transmit the requests to the plurality of removable storage devices and transmit the responses to the host device.

* * * * *